(12) United States Patent
Dahlby et al.

(10) Patent No.: US 7,339,906 B1
(45) Date of Patent: Mar. 4, 2008

(54) OPENING A COMMUNICATIONS STREAM BETWEEN A USER TERMINAL AND A BASE STATION

(75) Inventors: Douglas C. Dahlby, Fremont, CA (US); Mitchell D. Trott, Mountain View, CA (US); Christopher R. Uhlik, Danville, CA (US)

(73) Assignee: ArrayComm, LLC, San Jose, CA (US)

( * ) Notice: Subject to any disclaimer, the term of this patent is extended or adjusted under 35 U.S.C. 154(b) by 773 days.

(21) Appl. No.: 09/812,770

(22) Filed: Mar. 20, 2001

(51) Int. Cl.
*H04Q 7/00* (2006.01)
*H04Q 7/20* (2006.01)
*H04B 7/212* (2006.01)

(52) U.S. Cl. .................... 370/329; 370/442; 455/434

(58) Field of Classification Search .......... 370/329, 370/414, 466, 468, 463, 465, 467, 348, 328, 370/310, 336, 345, 431, 347, 337; 455/403, 455/422; 707/220, 227, 228; 445/450
See application file for complete search history.

(56) References Cited

U.S. PATENT DOCUMENTS

| | | | | |
|---|---|---|---|---|
| 5,239,545 A * | 8/1993 | Buchholz | ............. | 370/348 |
| 5,640,395 A * | 6/1997 | Hamalainen et al. | ....... | 370/322 |
| 5,642,354 A * | 6/1997 | Spear | .................. | 370/329 |
| 5,729,541 A * | 3/1998 | Hamalainen et al. | ....... | 370/337 |
| 5,732,075 A * | 3/1998 | Tangemann et al. | ........ | 370/343 |
| 5,878,056 A | 3/1999 | Black et al. | | |
| 5,883,090 A * | 3/1999 | Dorsch et al. | ........... | 514/222.5 |
| 5,883,887 A * | 3/1999 | Take et al. | .................. | 370/329 |
| 5,926,469 A * | 7/1999 | Norstedt et al. | ............ | 370/329 |
| 6,031,832 A * | 2/2000 | Turina | ....................... | 370/348 |
| 6,052,594 A * | 4/2000 | Chuang et al. | ............. | 455/450 |
| 6,167,248 A | 12/2000 | Hamalainen et al. | | |
| 6,314,292 B1 * | 11/2001 | Ho et al. | .................... | 455/450 |
| 6,366,779 B1 * | 4/2002 | Bender et al. | ............. | 455/450 |
| 6,373,833 B1 * | 4/2002 | Suonvieri et al. | ........... | 370/347 |
| 6,400,951 B1 * | 6/2002 | Vaara | ......................... | 455/436 |
| 6,477,375 B1 * | 11/2002 | Ho et al. | .................... | 455/445 |
| 6,493,552 B1 * | 12/2002 | Hicks | ...................... | 455/435.2 |
| 6,532,225 B1 * | 3/2003 | Chang et al. | ............... | 370/341 |
| 6,539,030 B1 * | 3/2003 | Bender et al. | ............. | 370/469 |
| 6,584,325 B1 * | 6/2003 | Shakhgildian | ............. | 455/525 |
| 6,594,494 B1 * | 7/2003 | Kakehi | ...................... | 455/437 |
| 6,633,559 B1 * | 10/2003 | Asokan et al. | ............. | 370/350 |

(Continued)

OTHER PUBLICATIONS

The GSM SYstem for Mobile Communicatins, by Michel Mouly & Marie-Bernadette, p. 193, © 1992, ISBN #2-9507190-0-7.*

*Primary Examiner*—Kwang Bin Yao
*Assistant Examiner*—Warner Wong
(74) *Attorney, Agent, or Firm*—Blakely Sokoloff Taylor & Zafman LLP

(57) ABSTRACT

A method and apparatus are provided that allow a communications stream to be quickly opened between two terminals. According to one aspect of the present invention, the invention includes registering the base station and the user terminal with each other by exchanging identification information and configuration information, sending a request to open a communications stream message from the user terminal to the base station, receiving a channel assignment message from the base station in response to the request message, the channel assignment message including an identification of an assigned communications channel for the communications stream, and sending data from the user terminal and receiving data from the base station over the assigned communications channel.

23 Claims, 4 Drawing Sheets

U.S. PATENT DOCUMENTS

| | | | |
|---|---|---|---|
| 6,661,514 B1 * | 12/2003 | Tevs et al. | 356/337 |
| 6,683,860 B1 * | 1/2004 | Forssell et al. | 370/329 |
| 6,771,618 B1 * | 8/2004 | Ueda | 370/329 |
| 6,804,212 B1 * | 10/2004 | Vallstrom et al. | 370/331 |
| 6,804,219 B2 * | 10/2004 | Koo et al. | 370/335 |
| 2001/0023186 A1 * | 9/2001 | Krishnamurthi et al. | 455/450 |
| 2002/0082033 A1 | 6/2002 | Lohtia et al. | |
| 2002/0115459 A1 * | 8/2002 | Chuang et al. | 455/522 |

* cited by examiner

OPENING A COMMUNICATIONS STREAM BETWEEN A USER TERMINAL AND A BASE STATION

BACKGROUND OF THE INVENTION

1. Field of the Invention

The invention relates generally to the field of digital signal communications and channel allocation. More particularly, the invention relates to opening a communications stream between two communicating terminals that are already known and identified to one another.

2. Description of the Related Art

In data communications systems that share communications channels, a procedure must be implemented to allow different users to take turns using the channels. In many systems, users are allocated a channel for a limited period of time. Then the channel is de-allocated and allocated to another user. This is known as a circuit switched system. In circuit-switched systems extensive setup must be done so that subsequent packets do not need to carry the full routing information. The packets instead will always travel the same circuit until that circuit is switched. In other systems, channels are never allocated but are always shared. This kind of system requires no overhead signaling for channel allocation but must have some way of directing packets and of resolving conflicts. Such systems are typically called packet-switched because each packet contains the full routing information required to direct the packet to its intended destination. Packet switching requires no overhead in the setup but adds significant overhead to each packet.

More specifically, a circuit-switched system may have a set of control channels which, are dedicated for use in allocating and de-allocating traffic channels to the various users. If there are many users sending short data sets, the control channel can require a significant portion of the available communications bandwidth. If insufficient bandwidth is provided for the control channels then, at least for some traffic patterns, particularly ones with frequent requests for a short-lived channel, the control channels can be a bottleneck to system usage even when traffic channels are not fully utilized.

Control channel usage can be made more efficient by requiring a multistage handshake each time a circuit is opened. The control channel can be used for the first stage and other channels, such as traffic channels, can be used for the later stages. The process can be initiated on a paging or random access channel. This approach allows a special channel to be optimized for each function. However, each of the optimized channels will still consume communications bandwidth that then cannot be used for traffic.

Packet switched networks eliminate all of the control channel overhead. However, collisions must be accommodated in some way. Since channels are not assigned for the shared channel, unless all of the users are known and have consistent traffic patterns, the shared channel will be underutilized. In part, the underutilization will come from available transmission times that are not used and, in part, the underutilization will come from several users attempting to use the shared channel at the same time.

In systems in which terminals are not identified and properly synchronized before transmitting, a "training" period is needed. The training period occurs when a channel is opened to allow two wireless endpoints to synchronize or fine-tune their timing, frequency, power, and spatial processing. The training period increases latency because of the degraded performance until the training is complete. The training period may also degrade system capacity by increasing interference between channels.

The present invention can minimize the difficulty of opening communication channels. This allows channels to be used for very short durations without dedicating a large amount of the communications resources to overhead. As a result, the communications system can be packet-oriented rather than connection-oriented without being packet-switched. As a result, the communications system can efficiently create circuits which only deliver a few packets.

Among the difficulties to be minimized in opening communications are latency and contention between users. Latency between the time a channel is requested and the time it is granted can be reduced by optimizing the channel request and channel allocation messages and by pre-registering users on the network. Latency between the time a channel is granted and the time that full channel throughput is reached can be minimized by providing other channel characteristics and parameters along with the channel request. It can also be minimized using channel characteristics and parameters that have already been exchanged in an earlier registration session. Limits on system capacity due to contention between users can be reduced by limiting the number of messages required to request and grant a channel and by using in-band signaling for many exchanges.

The present invention can be regarded as a hybrid of packet-switched and circuit-switched systems. It can be regarded as being a circuit-switched system, which is heavily optimized to make it efficient for the circuits to last for only a few packets before being torn down. Alternatively, it can be regarded as being packet-switched, but having the facility to combine all higher-level packets that are available during a specified period of time into a single air interface "packet" (stream) so that the routing info is amortized over many of the higher-level packets.

BRIEF SUMMARY OF THE INVENTION

A method and apparatus are provided that allow a communications stream to be quickly opened between two terminals. In one embodiment, the invention includes registering the base station and the user terminal with each other by exchanging identification information and configuration information, sending a request to open a communications stream message from the user terminal to the base station, receiving a channel assignment message from the base station in response to the request message, the channel assignment message including an identification of an assigned communications channel for the communications stream, and sending data from the user terminal and receiving data from the base station over the assigned communications channel.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

Figure 1A:
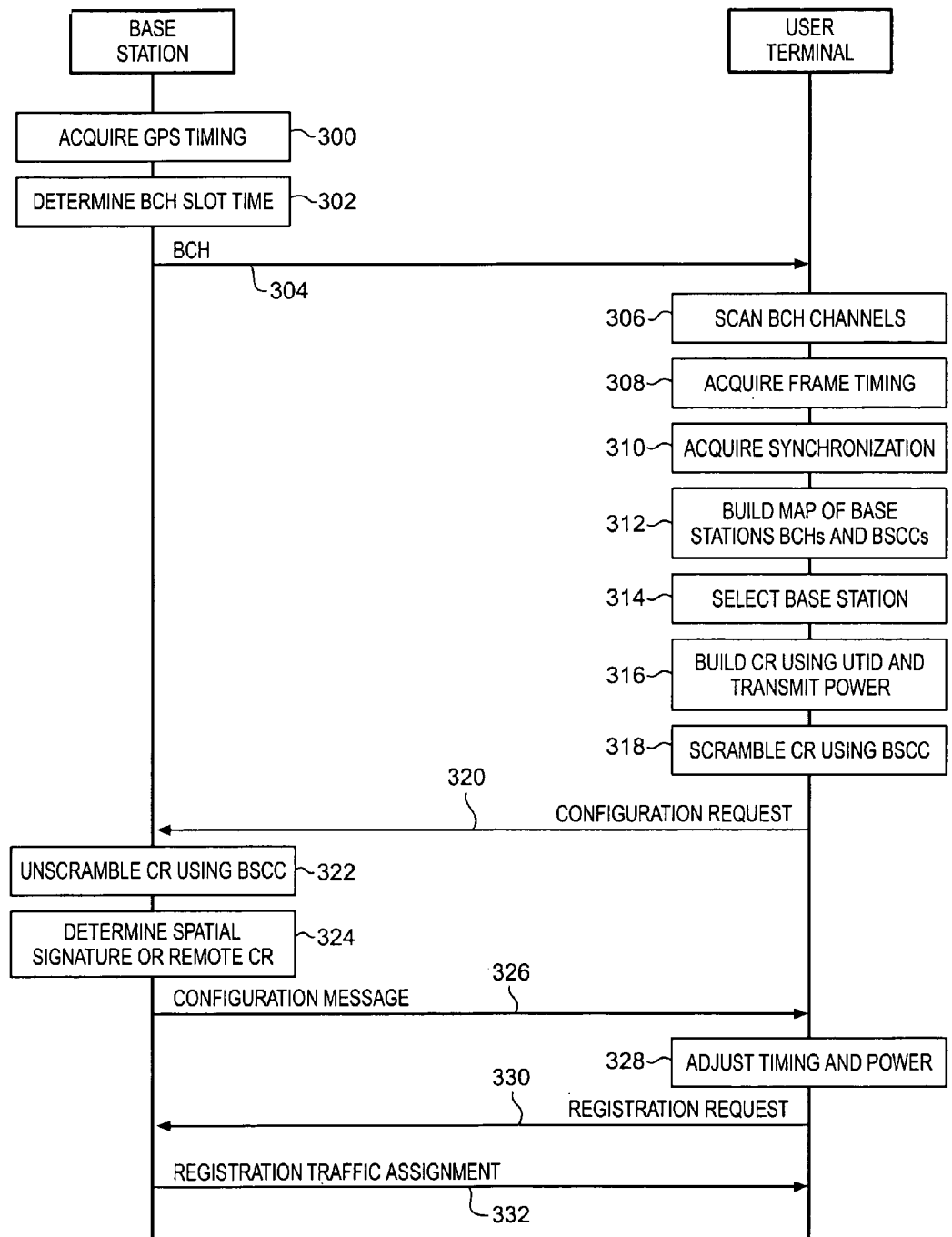
FIGS. 1A and 1B are a diagram showing an exchange of messages between two terminals in accordance with the present invention.

The present invention allows for the communication of data, which may represent numerical, textual, graphical, pictorial, audio, video, voice or any other type of information between terminals in a communications system. Generally, the terminals will be referred to herein as user terminals and base stations and communications will be between a user terminal and a base station. However, the terminals can be in any of a variety of other configurations and communications can be between peers, such as two user terminals or two base stations and communications can be broadcast or multicast as is desired for the particular system under consideration.

The data is transmitted as packets in duplexed circuit-switched channels called streams. Each new channel constitutes a new stream. The stream, in one embodiment is a slot assignment of a frequency-hopping time division duplex TDMA (time division multiple access) radio communications system, although other types of channels are also appropriate for application of the present invention depending upon the circumstances. In this embodiment, the stream is made up of an uplink slot to send data to the base station and a downlink slot to receive data from the base station. The slots are a portion of a repeating 5 msec frame on a channel that hops frequency every frame.

In one embodiment, a stream is opened when a user terminal transmits a request to the base station that will be called RA-rts (Random Access—request to send). The RA-rts is sent on a previously designated channel for RA (Random Access) messages. In one embodiment the RA channel is a set of channels, which may be the same set of channels used to exchange traffic bursts. The base station, upon receiving the message, determines whether a stream can be opened for the requesting user terminal and, if so, sends an AA-cts (Access Acknowledgment—clear to send) message back to the user terminal that identifies the channel for the stream, both the uplink portion on which the user will send and the downlink portion on which the user terminal will receive. This exchange opens the stream and allows data to be exchanged. In one embodiment, in-band signaling is provided so that further signaling, requests and control messages can also be sent in the stream thereby freeing capacity in the random access channels. Because of a prior registration process to be described in more detail below, no further messages are necessary in order to open a stream. As a result, the stream can be opened within the course of one uplink random access timeslot and the following downlink timeslot within the same frame. Assigning streams quickly allows streams to be closed more frequently without significantly affecting communications speed between the user terminal and the base station and without causing the channel to be used for stream assignment when it could be used for stream data traffic. This allows the total capacity of shared system resources to be increased.

The user terminal will typically open a stream when it has data in a buffer to be sent to the base station. As mentioned above, the data may be of any kind including a request for data from or via the base station. If, for example, the user terminal is being used as a web browser, the data can be simply an HTML (Hyper-Text Markup Language) request to retrieve a web page with a particular URL (Uniform Resource Locator). Such a message when received by the base station might be transmitted to an ISP (Internet Service Provider) to retrieve the page or the base station may be an ISP.

The user terminal may also request that a stream be opened in response to a request from a base station. In one embodiment, the base station can send an RA-rts to the user terminal, which can then respond with AA-rts. In another embodiment, the base station can send a page message to the user terminal asking the user terminal to request that a stream be opened. If the user terminal is able to, then in response to the page message, the user terminal sends a RA-rts message to the base station, as discussed before. The advantage of initiating the stream through the user terminal will become clearer as the various messages are described below. Requiring the base station to make all determinations regarding opening streams allows communications system resources to be more efficiently utilized under the central control authority of the base station.

Figure 3:
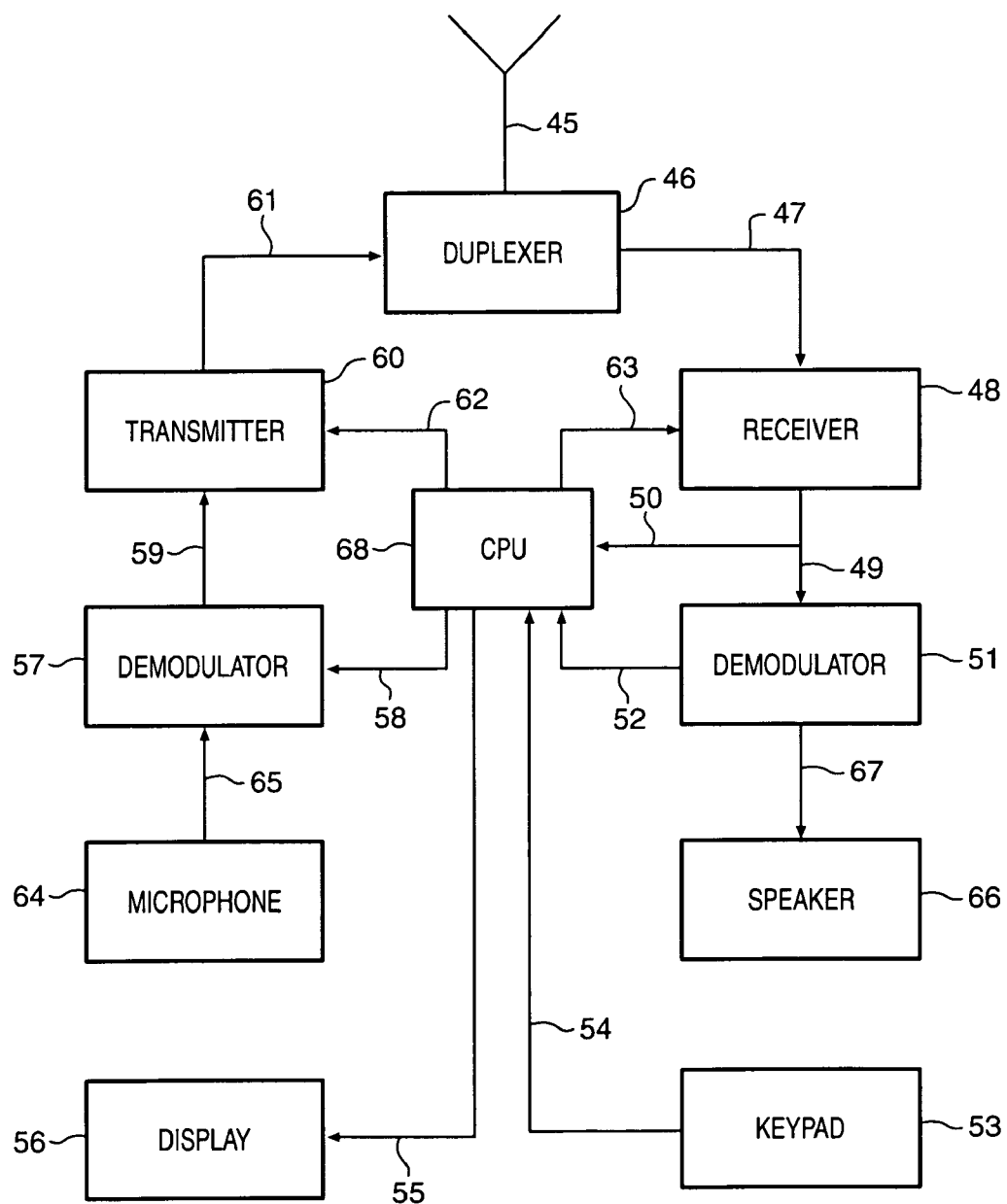
FIG. 3 is a block diagram illustrating an alternate exemplary architecture of a wireless communications system appropriate for use with the present invention.

In one embodiment, the present invention is implemented in a Spatial Division Multiple Access (SDMA) radio data communications system as shown and described further with respect to FIGS. 3 and 4. In such an SDMA system, each terminal is associated with a set of spatial parameters that relate to the radio communications channel between, for example, the base station and a user terminal. The spatial parameters comprise a spatial signature for each terminal. Using the spatial signature and arrayed antennas, data can be sent to several different user terminals at the same time using the same radio frequency and time slot. Conversely, data can be received from several different user terminals at the same time on the same radio frequency and time slot. The spatial signatures allow the otherwise colliding signals to be resolved. The spatial signatures can include such things as the spatial location of the transmitters, (the directions-of-arrival (DOAs), times-of-arrival (TOAs) and the distance from the base station. Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Extended Kalman filters or other types of linear filters, well-known in the art, can be used to exploit the properties of the training sequences in determining spatial parameters. Further details regarding the use of SDMA systems are described, for example, in U.S. Pat. Nos. 5,828,658, issued Oct. 27, 1998 to Ottersten et al. and 5,642,353, issued Jun. 24, 1997 to Roy, III et al.

Registration

A user terminal forms a relationship with a base station called a registration or session. This registration begins by listening to a BCH (Broadcast Channel) and ends with a handover, timeout, or disconnection. The first step of registration is accomplished by a user terminal by sending a CR (Configuration Request) burst and receiving a CM (Configuration Message) burst. The CM contains basic configuration parameters such as hopping sequence calculation parameters. Using the information from the CM, the user terminal then opens an unauthenticated registration stream using a RA-rreq (Random Access registration request) message. This unauthenticated stream carries only in-band signaling data used to complete registration and assignment of a RID (Registration Identifier) and PID (Paging Identifier). Using the RID, assigned at the end of the registration stream, the user terminal can open subsequent streams and it can end the registration. Using the PID, the user terminal can identify the pages that are directed to it from the base station. A user terminal can have more than one registration with the same or several different base stations. Each registration and session has a unique RID.

During the registration stream, identities and capabilities are exchanged, operating parameters are set, and a RID and PID are assigned. Later, streams may be created and attached to this RID, or the registration state, i.e. RID, PID, and operating parameters, may be even from a hibernating registration on the same base station modem. The specific details of registration are provided here as examples only. Many other registration scenarios are also possible within the scope of the present invention.

Figure 1B:
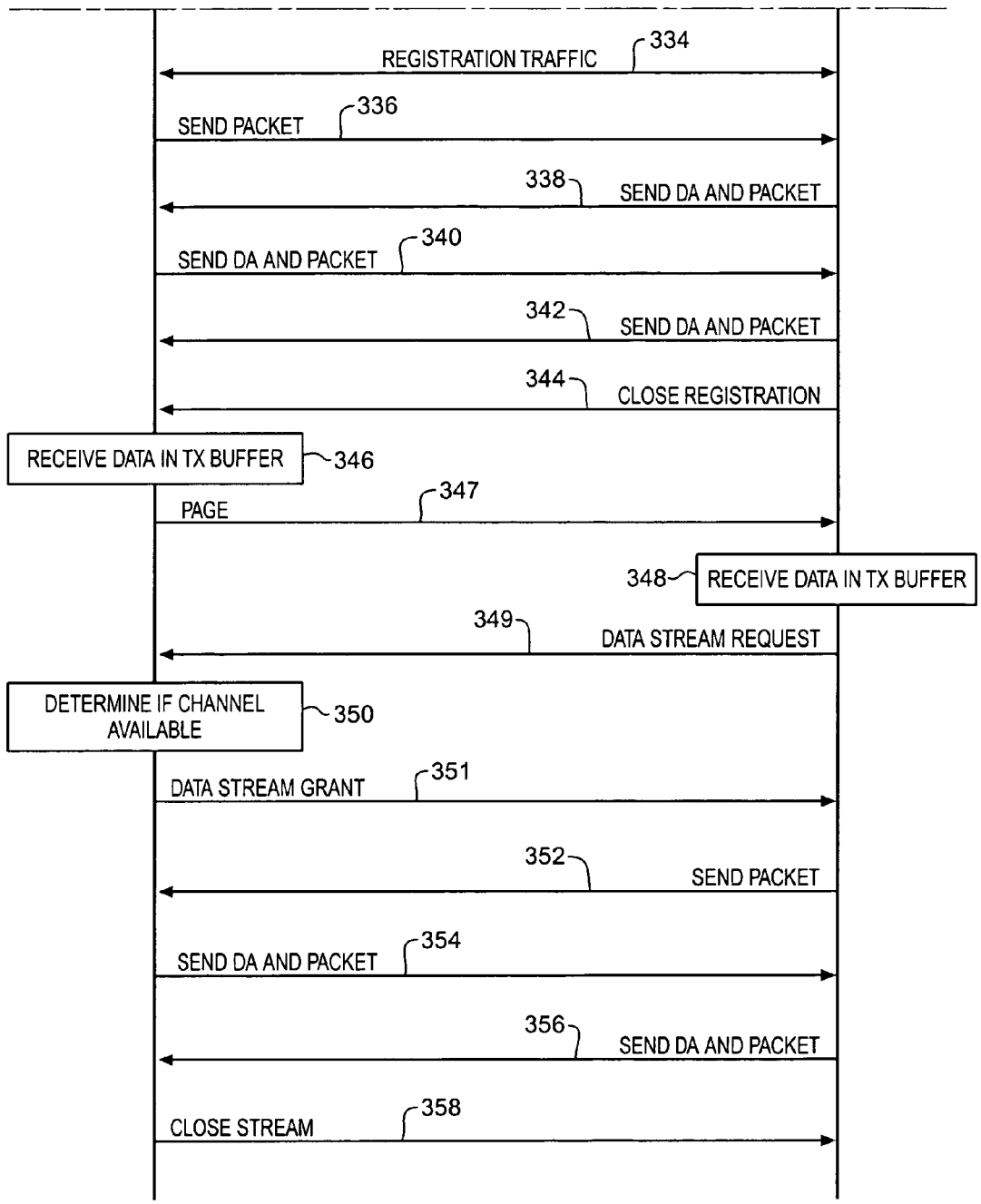

Referring to FIGS. 1A and 1B, the frame timing is established by the base stations that are in the area and transmitting on a pre-programmed RF carrier. The carrier may be a frequency hopping or spread spectrum carrier. However, it is preferred that the carrier be easy to find and be pre-programmed into the user terminals. The base stations, or base station if there is only one, employ GPS or some other precise common timing reference to establish the frame timing 300. GPS timing offers the advantage that it is accurately synchronized and inexpensively available to all base stations. This allows the BCH to be shared by all the base stations with only a minimal guard time in the BCH between base stations. The base stations then build the BCH frame 302 described above and broadcast in their respective assigned slots 304.

When a user terminal turns on, it scans the BCH carrier, a well-known, optionally pre-programmed, RF carrier 306 to find basic frame timing 308 and synchronization 310. The user terminal scans this carrier for BCH bursts, building an RSSI (Received Signal Strength Indicator) map 312. From this BCH RSSI map and other factors, the user terminal selects the strongest or the best base station 314. It also uses the BCH to precisely adjust its oscillator frequency and adjust its frame timing reference 308, 310. This is done using the synchronization and timing sequences in the BCH burst. Then, using its UTID (User Terminal Identification) it builds 316 and sends 320 a CR (Configuration Request), timed relative to the BCH burst for that strongest or best base station. In one embodiment, the CR is scrambled using the BSCC that was received in the BCH from the selected base station 318.

If the intended base station successfully receives the CR and has available capacity, it unscrambles the CR 322, and determines the spatial signature of the user terminal 324. The user terminal receives a CM (Configuration Message) burst in reply 326. The CM contains sufficient information for the user terminal to learn its distance and RF path-loss to the base station, correct its timing advance, adjust its power control, and learn the parameters of frequency hopping (e.g. frame numbering and BSCC (Base Station Color Code) 328. Several base stations may be probed with a CR to find the closest or the best base station. Based on this information from the CM, the user terminal, when it has data to transmit, can start a session, beginning with a RA-rreq (Random Access-registration request) 330. If resources are available, the base station sends an AA-reg-ack (Access Assignment—registration-acknowledgment) 332 to the user terminal assigning a traffic channel for the registration process. The base station and user terminal exchange various access control parameters including encryption keys on this established stream. Finally a RID and PID are assigned. Using this RID, the user terminal can establish secure streams (using e.g. RA-rts/AA-cts as discussed above) in which it transmits and receives data packets 334 until the registration stream is closed 344.

The traffic channel includes a data acknowledgement DA or a data invalid DI response to each transmission. The DA and DI messages are transmitted in the transmission from the recipient in the next timeslot. In a time division duplex frame, the base station and the user terminal alternate slots 336, 338, 340, 342 or group of slots, as shown in FIG. 1A. Accordingly, if any slots are not received properly, the data can quickly be retransmitted. This reduces the size of the data buffers at the respective base station and user terminal modems. As shown in Table 1, uplink slots always precede downlink slots and there is a guard time between the two in order to allow for any synchronization errors or unanticipated propagation delays. In one embodiment, each side transmits data packets in three slots, each slot including ramp-up and ramp-down periods as well as synchronization bits as is well-known in the art.

TABLE 1

| 1 2 3 | | 1 2 3 | | 1 2 3 ... |
|---|---|---|---|---|
| Uplink Slots | Guard Time | Downlink Slots | Guard Time | Uplink Slots |

Periodically, the user terminal scans the BCH to update its RSSI and BSCC map. When it detects a better base station, it may send a CR to this new base station and possibly handover its network session, i.e. its registration. If successful stream initiation fails too many times, the user terminal enters a timeout state. From timeout, it may try to regain a RID via RA-rreq, refresh its timing advance using a CR, find a new base station to which it might handover by scanning the BCH, or even begin from scratch to re-acquire basic frame timing. If this re-establishment is successful, the user terminal may be able to continue its network session by completing a network session handover to the new base station.

Configuration Request CR

An example of a CR (Configuration Request) burst structure is shown in Table 2. CR bursts are distinguished from RA (Random Access) and TCH (Traffic Channel) bursts, in part, by a special CR spatial training sequence. The CR training sequence is longer than normal and has periodic properties that make finding timing alignment especially computationally efficient. The CR burst is shorter than a standard uplink data burst to allow for time-delay with unknown distance between the user terminal and base station.

Table 2 below summarizes the content of the example CR burst. The 82 information symbols are constructed from the configuration request message using modulation and coding.

TABLE 2

| Duration | Contents |
|---|---|
| 10 μsec | ramp-up |
| 260 μsec | training symbols $a_1, a_2, \ldots, a_{130}$ |
| 164 μsec | information symbols $h_1, h_2, \ldots, h_{82}$ |
| 10 μsec | ramp-down |
| 86 μsec | extra guard time |
| 15 μsec | inter-burst guard time |

CR spatial training is the same for all base stations and the base station does not necessarily know the location of the user terminal before receiving the CR. CRs are transmitted by user terminals at a fixed offset from BCH transmissions.

CR and CM are scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register. Finally the smart antenna spatial resolution ability of the base station is applied to resolve any remaining ambiguities in received CRs.

A configuration request message is mapped onto a configuration request burst by the physical layer. A configuration message is mapped onto a standard downlink burst by the physical layer. The information symbols of the CR burst are mapped out as shown in Table 3, below. Any of the items listed below can be deleted and transmitted later during the registration cycle or not at all based on the needs of the system.

TABLE 3

Configuration Request Message

| Field | # of Bits |
| --- | --- |
| identity | 8 |
| utClass | 4 |
| txPwr | 5 |
| Total | 17 |

The meanings of the symbol sets are as follows:

identity: a set of unique random bits for each user terminal that differentiate simultaneous messages from multiple user terminals. Because of the randomness and large number of bits, it is unlikely that two user terminals will select the same identity code at the same time.

utClass: identifies user terminal capabilities (highest modulation class, frequency hopping capabilities, etc.). This sequence identifies the type of user terminal that sent the CR. A palmtop digital assistant might have different capabilities than a desktop computer with a fixed dedicated antenna. With utClass, the different capabilities can be distinguished.

txPwr: the power used by the user terminal to transmit the Configuration Request burst. For example, user terminal power=(2·txPwr−30) dBm.

CR is sent on the control carrier, as an example, exactly 2265 μsec after receipt of a downlink BCH burst. In this way, an otherwise uninitialized user terminal can send CR without any knowledge of the frequency hopping sequence parameters. The CR burst is shorter than a standard uplink time slot to allow for unknown time-of-flight from the user terminal to the base station and typically arrives late in the uplink time slot receive window.

Configuration Message CM

Table 4 below summarizes the content of an example Configuration Message burst. The 460 information symbols are constructed from the configuration message using modulation and coding.

TABLE 4

| Duration | Contents |
| --- | --- |
| 10 μsec | ramp-up |
| 68 μsec | training symbols $a_1, a_2, \ldots, a_{34}$ |
| 920 μsec | information symbols $h_1, h_2, \ldots, h_{460}$ |
| 68 μsec | training symbols $a_1, a_2, \ldots, a_{34}$ |
| 10 μsec | ramp-down |
| 15 μsec | inter-burst guard time |

The configuration message CM burst is sent on the BCH carrier, after sending a downlink BCH burst, whenever CR was received on the corresponding uplink time slot. CM is also sent in a spatially directed signal based on the analysis of the spatial signature of the received CR burst, for example parameters, such as DOA (direction of arrival) and TOA (time of arrival) of the uplink CR. Since CM is sent on the BCH carrier, a fixed time offset from BCH, an otherwise uninitialized user terminal can receive CM without any knowledge of the frequency hopping sequence parameters. CM, in response to CR, includes, among other things; the AFN (Absolute Frame Number), a larger timing-advance adjustment dynamic range, coarser power control, and various access control parameters. Table 5, below summarizes the content of the CM burst. Any of the items listed below can be deleted and transmitted later during the registration cycle or not at all based on the needs of the system.

TABLE 5

Configuration Message

| Field | # of Bits |
| --- | --- |
| identity | 8 |
| pwrCtrl | 4 |
| timingAdjust | 7 |
| AFN | 10 |
| carrierMask | 16 |
| racarrierMask | 16 |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: offset=(2·pwrCtrl−16) dB.

timingAdjust: timing advance that the user terminal should apply to future random access bursts: timing advance=timingadjust μs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are nonzero.

raDec: AFNs available for random access channels.

hopping: if equal to 1, the relationship between physical and logical carriers hops each frame.

Random Access-request to send burst

As can be seen from the discussion above, after registration, the user terminal has a RID and a PID and a fair amount of information about the network, including all of the data listed in Table 5. This information includes an assigned random access channel or set of assigned random access channels and an initial transmit power level. This information is used in generating and sending the RA-rts.

It should be noted that the RA burst has a fairly long training sequence, 146 μs in the present embodiment. This allows better spatial processing by the base station and its arrayed antennas. The same extended training sequence is used for the uplink TCH burst. The downlink TCH burst by contrast has 68 μs training sequence. This RA burst training sequence is long in comparison to the downlink training sequence, which is shorter by approximately half, even though the downlink timeslots are approximately twice as long. The base station, using measurements for the extended uplink training sequence can set spatial parameters that allow the user terminal to receive downlink messages with very little training.

Referring again to FIGS. 1A and 1B, after the user terminal has been registered with a particular base station, it can open a stream for a data exchange. The opening of a stream can be initiated by either the base station or the user terminal. Typically a stream will be opened if either the base station or the user terminal has data to send to the other. This data is buffered until a preset amount has accumulated in a transmit buffer or until a preset amount of time has elapsed. The preset amount can be any non-zero value. If the base station has accumulated transmit data in its buffer 346 for the user terminal, then it will send a page, described in more detail below, to the user terminal 347. If the user terminal receives a page or if it has accumulated a sufficient amount of data in its transmit buffer 348, then it will send, for example, an RA-rts message 349. This message, as explained below, is a request that a stream be opened to allow the exchange of data. The base station upon receiving the RA message will analyze its system resource availability 350 and if a suitable channel is available, then it will respond with, for example an AA-cts message 351. This message, as explained below, identifies a channel and assigns it for the stream.

With the RA/AA exchange, the stream is assigned and all the necessary information for the terminals to communicate has been exchanged. With the next uplink slot, the remote terminal will begin sending its data over the assigned channel 352. If the stream was initiated by a page from the base station, then the remote terminal may not have any data to send in which case it will send idle bits. The idle bits help the base station to maintain its spatial parameters for the user when there is no data received. The base station will use these spatial parameters to send its data packets or idle bits 354. In this way, data and acknowledgments are exchanged in the same way as for the registration stream 352, 354, 356. When both sides have exhausted their transmit buffers the stream will be closed 358. The stream can be closed by either the base station or the remote terminal. The base station can close the stream for resource management reasons, even if the transmit buffers have not been exhausted as is well-known in the art.

Table 6 below summarizes the content of an example Random Access Message burst. The burst structure is the same as an uplink data burst on a traffic channel TCH. For an uplink data burst, the information symbols carry data or in-and signaling or both.

TABLE 6

| Duration | Contents |
| --- | --- |
| 10 μsec | ramp-up |
| 146 μsec | training symbols $a_1, a_2, \ldots, a_{73}$ |
| 364 μsec | information symbols $h_1, h_2, \ldots, h_{182}$ |
| 10 μsec | ramp-down |
| 15 μsec | inter-burst guard time |

The RA burst information symbols, in one embodiment, have the fields as shown below in Table 7.

TABLE 7

Random Access Message

| Field | # of Bits |
| --- | --- |
| RAType | 3 |
| ID | 15 |
| UTTxPwr | 5 |
| Total | 23 |

The meanings of the symbol sets are as follows:

RAType: the type of the RA burst as described in association with Table 8.

ID: the registration identifier, either the RID or, for page responses, the PID. This field can be used by the base station to prioritize stream requests. User terminals with a higher priority can be identified by the RID or PID and be granted a stream in preference to other users. The ID is also used to access the registration account and information of the requesting user terminal.

UTTxPwr: the power used by the user terminal to transmit the burst.

Any one or more of these fields may be deleted or modified and more fields may be added to suit particular applications.

The RAType field allows for there to be different types of RA messages sent on the same channel. Table 8 lists possible examples that can be supported with a three bit field. Further or different types of RA messages can be used depending upon the particular nature of the network. More bits can be used to allow for still more different types of messages. As an alternative, the user terminal may send a different RA burst depending on the circumstances as listed in Table 8. All of the RA bursts in Table 8 are sent on the random access channel assigned to the user terminal by the base station. In one embodiment, the RA channels are a set of channels that are also used for traffic.

TABLE 8

| Value | Symbol | Meaning |
| --- | --- | --- |
| 000 | RA-rts | stream request |
| 001 | RA-ping | keep-alive poll request |
| 010 | RA-rts-short | short stream request |
| 011 | RA-rts-directed | directed stream request |
| 100 | RA-page response | stream request due to page |
| 101 | RA-rts-UM | stream request, unacknowledged mode |
| 110 | RA-rreq | registration request |

The meanings of the symbol sets are as follows:

RA-rts will be discussed further below and is the mechanism with which the user terminal can open a new communications stream following registration.

RA-ping: can be used to alert the base station to the location, channel characteristics and activity of a user terminal without opening a stream. Pinging the base station can be used to keep a registration alive.

RA-rts short, -directed and -UM: can be used to open special types of streams.

RA-page response: can be sent when the user terminal has no data to transmit but is requesting that a stream be opened in response to a page from the base station. In some systems, it may be preferred that the base station open the stream directly without first paging the user terminal as discussed above.

RA-rreg: can be used to open a new registration or change an existing registration. As mentioned above, a user terminal uses the RA bursts after registration, however, it may be useful in network management for a single user terminal to have two registrations for different individuals, different accounts, different types of communications or other reasons.

Access Assignment Burst

The user terminal transmits any random access message such as RA-rts on the uplink side of the random access channel. The base station uses the downlink portion of the random access channel to grant random access requests and to assign resources to the requested data stream using an AA (Access Assignment) message. The AA message can have different formats. One format is shown in Table 9 below.

TABLE 9

Access Assignment Message

| Field | # of Bits |
|---|---|
| ID | 15 |
| AAType | 3 |
| modClassUp | 5 |
| modClassDown | 5 |
| frameDec | 3 |
| resource ibChan | 6 |
| pwrCtrl | 4 |
| timingAdjust | 5 |
| tOffset spChan | 3 |
| Total | 49 |

The meanings of the symbol sets are as follows:

ID: the id of the user terminal, either the RID or PID that was transmitted in the RA-rts.

modClassUp: identifies the modulation and coding used for the uplink.

modClassDown: identifies the modulation and coding used for the downlink.

frameDec: defines fractional rate channels.

resource ibChan: indicates the uplink/downlink resource pair that is assigned to the stream.

pwrCtrl: a power adjustment for the UT to apply to subsequent transmissions.

timingAdjust: a timing adjustment for the UT to apply to subsequent transmissions.

tOffset: training sequence offset adjustment for the UT to apply to subsequent transmissions.

AAType: indicates the type of Access Assignment message. Many different possible types are possible. Table 10 below provides one example set of AA types.

TABLE 10

| Value | Symbol | Meaning |
|---|---|---|
| 000 | AA-cts | stream grant |
| 001 | AA-reject | request rejected |
| 010 | AA-ping-ack | keep-alive poll acknowledgment |
| 011 | AA-cts-short | short uplink grant |
| 100 | AA-cancel | cancel previous false page |
| 101 | AA-prev-short-ack | previous short uplink was successful |
| 110 | AA-invalid-ack | received RA is not valid |
| 111 | AA-req-ack | registration grant |

The meanings of the symbol sets are as follows:

AA-cts: (Access Assignment-clear-to-send) begins a stream with the sending user terminal based on the parameters in the AA-cts message. An AA-cts can be sent in response to any of the RA messages and is particularly appropriate for RA-rts, RA-ping, RA-rts-directed, RA-page-response, and RA-rreg. This allows the base station to open a stream even if the user terminal was not aware of the need to open a stream. The next communication will be data in the opened stream. As mentioned above, data will be transferred until the corresponding stream data buffers are emptied. Typically the stream is then closed. However, the stream may be closed upon the occurrence of many other events as well.

AA-reject: can be used to reject the request and direct the UT to start a timer before sending an RA message. Such a response can relieve congestion on a busy base station. The UT in response may elect to wait or to send an RA-rts to another base station that has better traffic availability.

AA-ping-ack: acknowledges the RA-ping and resets the timers for the registration. The pinging process can be used to prevent a registration from expiring for lack of traffic. Maintaining the registration allows a stream to be opened immediately with e.g. an RA-rts and an AA-cts. If the registration expires then the registration process must be repeated before a data stream can be opened.

AA-cts-short, and AA-prev-short-ack: can be used for special types of streams.

AA-cancel: can be used to respond to an RA-page-response when no page was sent or the paging condition no longer applies.

AA-invalid-id: can be used to notify the UT that it is using a RID or PID that has expired or is not valid with the responding base station. The UT can use the information in the AA to request that a new registration stream be opened by sending e.g. RA-rreq.

AA-reg-ack: is the acknowledgment of RA-rreq that begins a registration stream.

As mentioned above, the base station can send a page to the UT directing the UT to send an RA-page-response message to the base station. In one embodiment, this reduces the control traffic overhead by using a paging channel. The paging channel can be efficiently utilized by the base station and the page can allow random access channel assignments that increase the channel efficiency of establishing the desired data stream. The page bursts are transmitted on a paging channel which may be used exclusively for pages or it may be shared with other functions such as a broadcast channel or a control channel. Alternatively a section of a traffic channel can be used for pages. Pages will contain an indication of the base station sending the page and of the user terminal being paged, typically the PID. If the UT is already registered then the page does not need to also include any information about how to respond to the page because this information can be included in the registration data exchange stream. In the embodiment discussed above, the UT will respond to a page in the random access channel by sending a RA-page-response message, however other types of responses are also possible.

In-Band Signaling

Within the data stream, any uplink or downlink burst can contain tagged data fields. The tagged fields can have user data and in-band signaling data. The in-band signaling can be used for layer 2 and layer 3 messages, including a request to shut down the stream, a request to open another stream, a request to change the type of the stream, or a request to update registration information. The in-band signaling can also be used for other things such as modulation and transmission channel data reports.

In one embodiment, either the base station or the user terminal can send the following messages:

alert: this message requests an immediate closing of the stream. The message can be replied to with no response. When the requesting terminal receives no data on the next traffic channel slot, it can assume that the alert was received by the other station. Such a protocol minimizes the time and overhead required to close the stream.

no new packets: this message requests that the receiving terminal stop adding packets to its transmission buffers. After the currently buffered packets are transmitted, the stream will be shut down. If, later on, further new packets arrive to be sent, then a new stream can be opened. Such a command can allow e.g. a base station to reallocate channels in order to optimize loading from different users.

Operation

As can be understood from the discussion above, the present invention allows a circuit switched communications channel to be opened with a single handshake by using a previous virtual circuit to set up constant routing information. The channel is the stream opened by sending a RA-rts message or an in-band rts message. The virtual circuit is the result of registration. All the routing information that does not depend on the physical channel assigned for the stream is done one time up front for all channels As a result, the handshake for opening a new stream that will allocate a physical channel can be minimized to a single channel request (RA-request to send) and a single channel grant (AA-clear to send). As can be seen from the discussion above, both of these messages are short reducing their impact on the random access channel. In addition, the two-message protocol minimizes the time needed to open physical channels.

In the present invention, the two-message protocol is possible without lengthy training or other sequences because registration has already been performed. It is performed one time to exchange any routing information that is the same regardless of which physical channel is being used. During registration, a unique token (RID or PID) is assigned. This token is communicated between channel endpoints during a channel request/grant as a concise way of identifying the extended routing information determined during registration.

The traffic load on the overhead channels is also reduced, as mentioned above, by allowing channel requests to be sent in-band within an existing stream. This avoids the latency of contention for the single or limited number of control channels.

As a further benefit the preliminary registration allows the channel (i.e. the stream) to be opened with a power level that is very close to the best power level for the channel. This avoids the increased latency that results in many systems from starting at too low of a power level and then increasing the power level until an adequate power level is reached. It also avoids the reduction in system capacity that results due to the increased interference caused by starting at too high of a power level and then decreasing it until an adequate power level is reached.

In the present invention, the UT uses the transmit and receive power levels of the broadcast channel (BCH) to select a power level to use for its configuration request CR message. The base station compares the signal to interference ratio (SINR) of the received CR message to the desired SINR and using the configuration message (CM) tells the UT how much to adjust its transmit power level for any subsequent random access (RA) channel bursts. When the base station receives an RA burst from the user terminal, it compares the RA SINR to the SINR that it desires and in the Access Assignment (AA) message tells the UT how much to adjust its power for traffic channel (TCH) bursts. The UT makes this power adjustment based on the type of modulation that it has been assigned for the TCH, and starts transmitting on the TCH for the granted stream at that power level. Because of the original registration process and because power level adjustment is built into the channel allocation process, power levels can be tightly controlled. This greatly reduces cross-channel interference. In a spatial diversity radio communications system, tightly controlled power levels can also increase the number of spatially distributed users that can share the same radio frequency.

A further part of the information that can be traded during the registration stream is modulation classes and data rate hardware capabilities of the user terminal. In a system that supports different data rates and modulation schemes based on traffic load, data rate requirements and hardware capabilities, data rates can be greatly enhanced by assigning an appropriate modulation class and data rate at the beginning of a stream. By using this information and by measuring the RF environment from information in the RA burst and the RA burst's RF qualities, a modulation class can be assigned with the AA burst that is very appropriate for the user and the channel. Again a lengthy adaptation process is avoided.

In spatial diversity radio communications systems, the present invention further allows communications on the traffic channel (TCH) to start with accurate spatial diversity parameters. As with the other radio channel parameters discussed above, beginning with more accurate spatial diversity parameters avoids the added latency of using several frames to gradually determine spatial information. In one embodiment, the user terminals transmit omni-directionally from a single antenna and the base station uses spatial diversity antennas to receive and transmit using spatial diversity parameters. This allows signals transmitted on the same channel from e.g. different locations to be resolved and it allows the base station to send different signals to different user terminals on a single frequency. The registration process includes enough signaling for the base station to develop an accurate set of spatial parameters for sending any pages. However, in one embodiment, pages are sent in all directions, in case the user terminal has moved after registration or radio channel conditions have changed. In addition, as described above, the uplink RA bursts also have a fairly long training sequence. This allows the base station to refine the prior spatial processing parameters in the event that the user terminal has moved or the channel has changed.

As a result of maintaining accuracy in the spatial processing parameters even early in each stream, SINR is reduced. This makes it easier to resolve the user's messages from interference caused by other users. Conversely, it makes it easier to receive messages from other users in the system by reducing the interference with the messages of those users. As a result, existing channels are less affected by interference from the opening of new streams by other users. In addition, other users requesting that a new stream be opened can be more aggressive in the starting power level. A fairly long training sequence for the uplink TCH bursts helps to allow spatial processing to determine the spatial location at relatively low SINRs.

Another benefit of maintaining accurate spatial parameters is to provide collision resolution for simultaneous RA-rts channel requests. With spatial processing and accurate spatial parameters, at least one of two or more conflicting RA bursts, should be resolvable unless they originate from nearly the same spatial location. This avoids wasting resources due to collisions. If collision cannot be resolved, then neither requestor can open a stream. The stream start latency of both requestors is impacted. If collision are resolved, then at least one requestor can succeed, and only the latency of the other requestor is impacted. By resolving collisions, the capacity of the random access channel is increased. This allows for a larger number of open stream requests to be handled using the same overhead channels. The requesters can be more aggressive in requesting streams and closing streams, which leads to higher trunking efficiency and lower latency.

Base Station Structure

Figure 2:
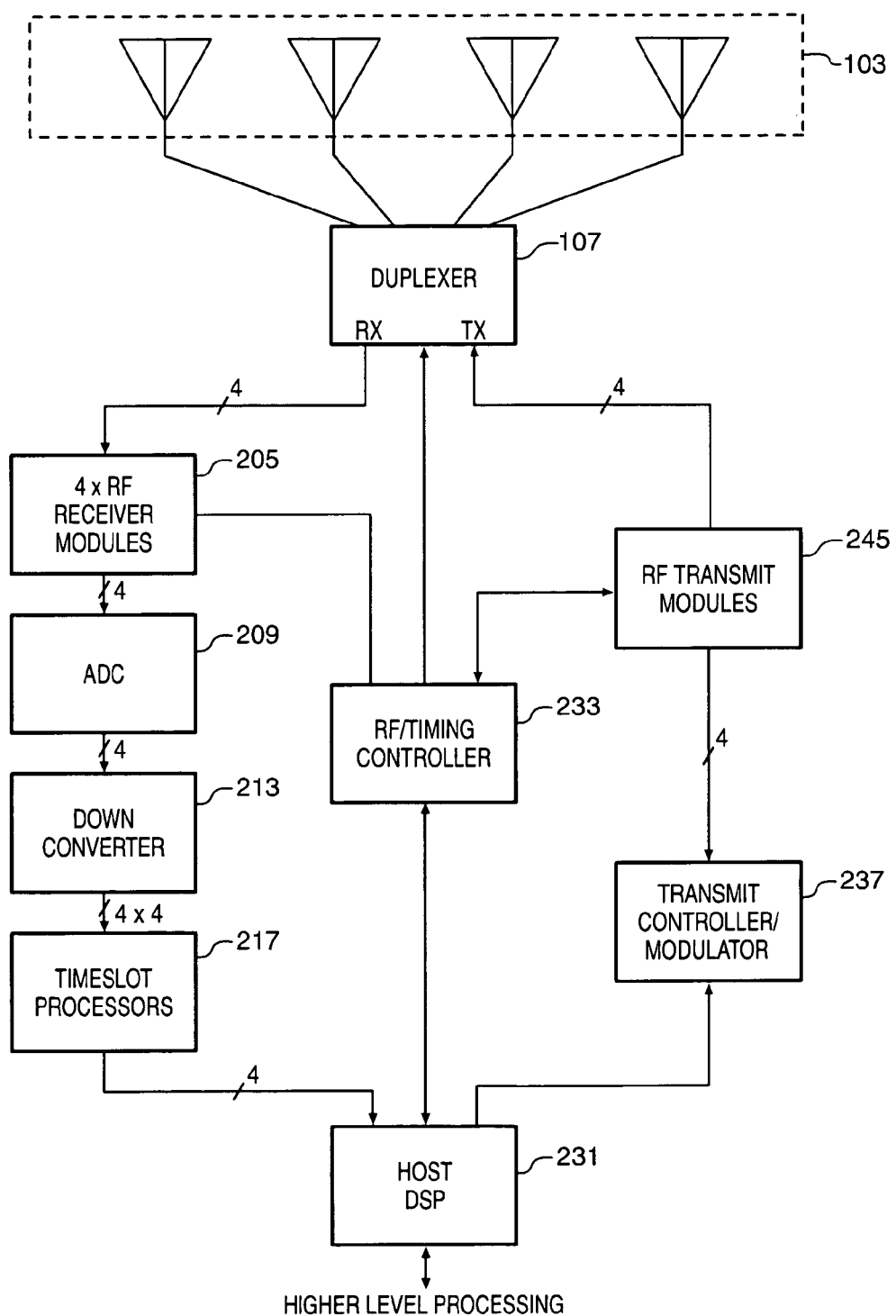
FIG. 2 is a block diagram illustrating an exemplary architecture of a wireless communication system appropriate for use with one embodiment of the present invention.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 2 shows an example of a base station of a wireless communications system or network suitable for implementing the present invention. The system or network includes a number of subscriber stations, also referred to as remote terminals or user terminals, such as that shown in FIG. 3. The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency to an FM intermediate frequency ("IF"). This signal then is digitized (sampled) by analog to digital converters ("ADCs") 209. Final down-converting to baseband is carried out digitally. The down-converting can be done using finite impulse response (FIR) filtering techniques. This is shown as block 213. The invention can be adapted to suit a wide variety of RF and IF carrier frequencies and bands.

There are, in the present example, four down-converted outputs from each antenna's digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56311 DSPs can be used as timeslot processors, one per receive timeslot. The timeslot processors 217 monitor the received signal power and estimate the frequency offset and time alignment. They also determine smart antenna weights for each antenna element. These are used in the spatial division multiple access scheme to determine a signal from a particular remote user and to demodulate the determined signal.

The output of the timeslot processors 217 is demodulated burst data for each of the four receive timeslots. This data is sent to the host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights for each user terminal to the host DSP 231. The host DSP 231 maintains state and timing information, receives uplink burst data from the timeslot processors 217, and programs the timeslot processors 217. In addition it decrypts, descrambles, checks error detecting code, and deconstructs bursts of the uplink signals, then formats the uplink signals to be sent for higher level processing in other parts of the base station. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 237. The host DSP also manages programming of other components of the base station including the transmit controller/modulator 237 and the RF timing controller shown as 233.

The RF timing controller 233 interfaces with the RF system, shown as block 245 and also produces a number of timing signals that are used by both the RF system and the modem. The RF controller 233 reads and transmits power monitoring and control values, controls the duplexer 107 and receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. Specifically, the received data bits are converted into a complex modulated signal, up-converted to an IF frequency, 4-times over-sampled, multiplied by transmit weights obtained from host DSP 231, and converted via digital to analog converters ("DACs") which are part of transmit controller/modulator 237 to analog transmit waveforms. The analog waveforms are sent to the transmit modules 245. The transmit modules 245 up-convert the signals to the transmission frequency and amplify the signals. The amplified transmission signal outputs are sent to antennas 103 via the duplexer/time switch 107.

User Terminal Structure

FIG. 3 depicts an example component arrangement in a user terminal that provides data or voice communication. The user terminal's antenna 45 is connected to a duplexer 46 to permit antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well-known in the art. The duplexer output 47 serves as input to a receiver 48. The receiver 48 produces a down-converted signal 49 which is the input to a demodulator 51. A demodulated received sound or voice signal 67 is input to a speaker 66.

The user terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a user terminal central processing unit 68 (CPU) as is received data before demodulation 50. The user terminal CPU 68 can be implemented with a standard DSP (digital signal processor) device such as a Motorola series 56300 DSP. This DSP can also perform the functions of the demodulator 51 and the modulator 57. The user terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications user terminal. In another embodiment, the microphone and speaker are also in direct communication with the CPU to provide voice or data communications.

The user terminal's voice signal to be transmitted 65 from the microphone 64 is input to a modulator 57. Traffic and control data to be transmitted 58 is supplied by the user terminal's CPU 68. Control data 58 is transmitted to base stations during registration, session initiation and termination as well as during the session or stream.

In an alternate embodiment, the speaker 66, and the microphone 64 are replaced or augmented by digital interfaces well-known in the art that allow data to be transmitted to and from an external data processing device (for example, a computer). In one embodiment, the user terminal's CPU is coupled to a standard digital interface such as a PCMCIA interface to an external computer and the display, keyboard, microphone and speaker are a part of the external computer. The user terminal's CPU 68 communicates with these components through the digital interface and the external computer's controller. For data only communications, the microphone and speaker can be deleted. For voice only communications, the keyboard and display can be deleted.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 2 or 3, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data is exchanged. Such systems include voice, video, music, broadcast and other types of data systems without external connections. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method for opening a communications stream comprising:
   registering a first radio with a second radio by sending identification information to the second radio;
   sending a request message to the second radio based on the registration in an uplink random access slot of a time division multiple access frame to open a communications stream, the random access slot being assigned during registering;
   receiving a channel assignment message from the second radio in a first time frame in response to the request message, the channel assignment message including an identification of an assigned communications channel for the communications stream, the assigned channel being in a slot of a repeating time frame; and
   sending data to the second radio in response to the channel assignment message in the assigned slot in a second time frame, the second time frame immediately following the first time frame.

2. The method of claim 1, further comprising receiving data from the second radio in the assigned slot in the second frame.

3. The method of claim 1, wherein the assigned channel is in a first slot for sending data to the second radio and in a second slot for receiving data from the second radio, the method further comprising receiving data from the second radio in the second assigned slot in the second frame.

4. The method of claim 1, further comprising:
   sending a further request message to the second radio to open a further communications stream based on the registration;
   receiving a further channel assignment message from the second radio in response to the further request message, the further channel assignment message including an identification of a further assigned communications channel for the further communications stream; and
   sending data to the second radio in response to the channel assignment message.

5. The method of claim 4, further comprising closing the first communications stream before sending the further request message.

6. The method of claim 1, wherein the request message comprises an extended training sequence to assist the base station in measuring spatial parameters.

7. The method of claim 1, wherein the request message includes information about a power level with which the request message is transmitted and wherein the channel assignment message includes information about a power level with which the first radio should transmit on the assigned communications channel.

8. The method of claim 1, wherein the channel assignment message includes a timing correction for the first radio to apply when sending data over the assigned communications channel.

9. The method of claim 1, further comprising receiving a page from the second radio and wherein sending the request message comprises sending the request message in response to the received page.

10. A machine-readable medium having stored thereon data representing sequences of instructions which, when executed by a machine, cause the machine to perform operations comprising:
registering a first radio with a second radio by sending identification information to the second radio;
sending a request message to the second radio based on the registration to open a communications stream, the request message being sent on a random access channel that was assigned to the first radio during registering and that is shared with other radios;
receiving a channel assignment message from the second radio in a first time frame in response to the request message, the channel assignment message including an identification of an assigned communications channel for the communications stream, the assigned channel being in a slot of a repeating time frame; and
sending data in response to the channel assignment message to the second radio in the assigned slot in a second time frame, the second time frame immediately following the first time frame.

11. The medium of claim 10, wherein the request message comprises an identification of the registration information.

12. A method for opening a communications stream comprising:
registering a first radio with a second radio by receiving identification information from the first radio and assigning a random access channel to the first radio, the assigned random access channel being shared with other radios;
receiving a request message from the first radio on the assigned random access channel based on the registration to open a communications stream, the request message comprising an identification of the registration and an extended training sequence;
sending a channel assignment message to the first radio in a first time frame in response to the request message, the channel assignment message including an identification of an assigned communications channel for the communications stream, the assigned channel being in a slot of a repeating time frame; and
using the extended training sequence to measure spatial Parameters of the request message;
sending data to the second radio based on the channel assignment message in the assigned slot in a second time frame, the second time frame immediately following the first time frame.

13. The method of claim 12, wherein sending the channel assignment message comprises sending the channel assignment message using the spatial parameters.

14. The method of claim 12, further comprising sending a page to the first radio and wherein the request message is in response to the sent page.

15. A machine-readable medium having stored thereon data representing sequences of instructions which, when executed by a machine, cause the machine to perform operations comprising:
registering a First radio with a second radio by receiving identification information from the first radio and assigning a random access channel slot to the first radio;
receiving a request message from the first radio on the assigned random access channel slot based on the registration to open a communications stream;
sending a channel assignment message to the first radio in a first time frame in response to the request message, the channel assignment message including an identification of an assigned communications channel for the communications stream, the assigned channel being in a slot of a repeating time frame; and
sending data to the second radio based on the channel assignment message in the assigned slot in a second time frame, the second time frame immediately following the first time frame.

16. The medium of claim 15, further comprising instructions which, when executed by the machine, cause the machine to perform further operations comprising receiving data from the first radio in the assigned slot in the second frame.

17. The medium of claim 15, wherein the assigned channel is in a first slot for sending data to the first radio and in a second slot for receiving data from the first radio, the medium further comprising instructions which, when executed by the machine, cause the machine to perform further operations comprising receiving data from the first radio in the first assigned slot in the second frame.

18. A method for opening a spatially directed radio communications stream comprising:
registering a first radio with a second radio by sending identification information and receiving a random access channel slot assignment from the second radio;
sending a request message to the second radio in the assigned random access channel slot based on the registration to open a communications stream;
receiving a spatially directed channel assignment message from the second radio in response to the request message, the channel assignment message including an identification of an assigned communications channel for the communications stream; and
sending data to the second radio and receiving spatially directed data from the second radio over the assigned communications channel in response to the channel assignment message.

19. The method of claim 18, wherein the request message comprises an extended training sequence to assist the second radio in determining spatial parameters, and wherein receiving the channel assignment message comprises receiving the channel assignment message directed using the spatial parameters.

20. The method of claim 18, wherein the channel assignment message comprises a training sequence and wherein the extended training sequence is at least twice as long as the channel assignment message training sequence.

21. The method of claim 18, wherein the request message comprises an identification of the registration information.

22. The method of claim 18, wherein the assigned communications channel is shared with other radios.

23. The method of claim 18, wherein registering further comprises sending configuration information including information regarding capabilities and communications environment of the first radio.

* * * * *